W. E. WOODARD.
CONNECTING ROD.
APPLICATION FILED JAN. 30, 1917.
1,245,416.
Patented Nov. 6, 1917.
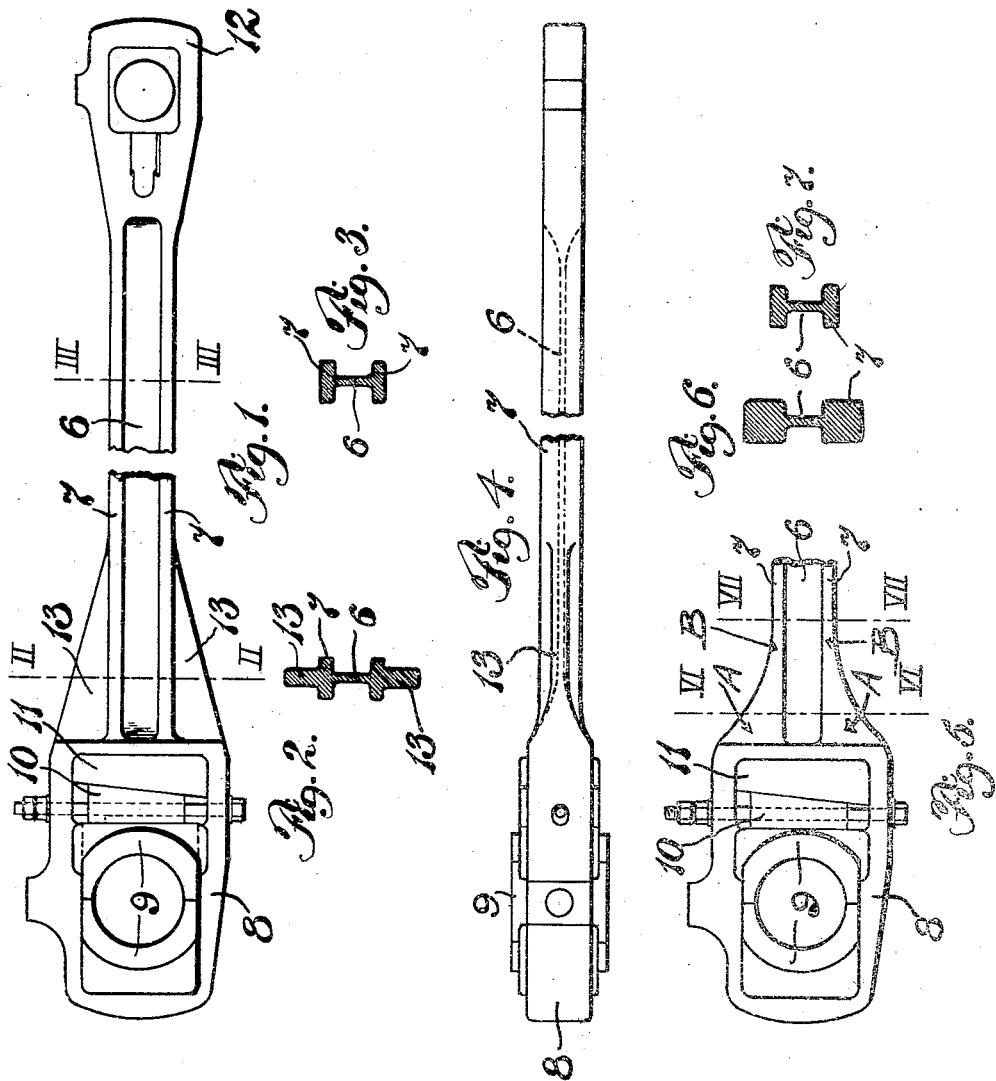
WITNESS
Arthur Synnestvedt
INVENTOR
William E. Woodard
BY
Synnestvedt Bradley Lechner & Fowles
ATTORNEYS

UNITED STATES PATENT OFFICE.

WILLIAM E. WOODARD, OF SCHENECTADY, NEW YORK.

CONNECTING-ROD.

1,245,416.   Specification of Letters Patent.   Patented Nov. 6, 1917.

Application filed January 30, 1917. Serial No. 145,347.

*To all whom it may concern:*

Be it known that I, WILLIAM E. WOODARD, of Schenectady, in the county of Schenectady and State of New York, have invented certain new and useful Improvements in Connecting-Rods, of which the following is a specification.

My invention relates in general to means for connecting the reciprocating member of a source of power to a revolving member thereof, and more particularly to connecting rods used in locomotive construction for linking the cross-head to the crank pin of a driving wheel, and in this specification I have illustrated my invention as embodied in a locomotive connecting rod.

In the accompanying drawings, Figure 1 is a side elevation of a locomotive main connecting rod; Figs. 2 and 3 are sections taken respectively on the lines II—II and III—III of Fig. 1; Fig. 4 is a plan view of Fig. 1; Fig. 5 is a partial side view of a locomotive connecting rod constructed in accordance with standard practice, illustrated for purposes of comparison; and Figs. 6 and 7 are sections taken respectively on the lines VI—VI and VII—VII of Fig. 5.

In practice my invention is applied to that class of main connecting rods wherein the crank pin stub end is constructed to contain the crank pin bearing brasses and which is formed integral with the main body portion of the connecting rod. In connecting rods of this character, an objection has arisen because that portion of the rod forming the connection between the crank pin stub end or head of the rod and the body section of the rod has to be made very heavy in order to give the desired strength. It has been found, however, that this heavy construction while giving strength to the rod adjacent the crank pin head is a detriment because it produces a peculiar distribution of the metal to which many cases of failure of this class of rod can be traced, as more fully hereinafter pointed out. It is the particular object of my invention to provide a rod of the requisite strength with a minimum of weight and with the elimination of the above referred to difficulty. My invention will be better understood by first briefly describing the form of construction which is practically standard, reference being had to Figs. 5, 6, and 7.

In main connecting rods which have the crank pin head formed integral with the main body portion of the rod, one end of the opening within the head is materially increased in order to permit the insertion and removal of the bearing brasses, the positioning members therefor, and the adjusting wedges. To compensate for this enlargement of the opening, it was necessary to greatly increase the mass of metal immediately adjacent to the head in order to get the desired strength at the head end of the rod. This standard crank pin head construction is shown in Figs. 5 and 6, and while it has the necessary strength adjacent the head, as at A, where the mass of metal is greatly increased, the disposition of the metal is such as to concentrate, at the parts B, the tremendous strain due to the whipping action on the rod incident to the up and down movement of the crank pin while the driving wheel revolves. This concentration of the strain results in breakage or failure of the rod at or about the points B. My improvement consists in constructing the rod in such manner as to distribute the strain of the whipping action over a considerable length of the connecting rod instead of localizing it at any one point, while at the same time the necessary strength at the crank pin head is obtained, and this with a minimum of metal.

In the embodiment of my invention herein illustrated, the body of the connecting rod is of I section, comprising a vertical web 6, top and bottom lateral flanges 7, a crank pin stub end 8 formed integral with the rod and adapted to contain the usual bearing brasses 9, the positioning members therefor, and the customary wedged shaped adjusting means 10 and 11; and a cross-head pin stub end 12. In order to provide the necessary strength at the crank pin head end, and in order to distribute the strains I provide on the exterior of the body of the rod and integral therewith members or ribs 13 extending between the body section and the crank pin stub or head which members or ribs are carried well forward on the rod with a comparatively long taper. These connecting members or ribs are cut away by the milling process so that their weight is reduced to a minimum, and their width is made less than that of the main body section (see Figs. 1 and 2). By providing such members, I obtain a truss-like construction which gives the requisite strength with a minimum of weight and serves to distribute the strain forwardly toward the cross-head end of the rod. It will be seen that it is advantageous to carry or distribute the strain toward the cross-head end of the rod, because the whipping action on the rod diminishes toward that end.

Another very important advantage is obtained by my invention, and this has to do with the adaptability of my improvements for better heat treatment. In modern locomotive practice many of the important forgings are heat treated and a difficulty has been encountered in connection with this heat treatment by virtue of the fact that the larger masses of metal will not cool at a rate corresponding to the cooling of adjacent parts. It will be seen that by my improvements I have obtained a construction and arrangement of connecting rod which can be heat treated in a thorough and satisfactory manner without encountering the difficulty just noted.

I claim:

1. As a new article of manufacture, a connecting rod having the crank pin stub end formed integral with the rod, and truss-like members formed integral with the rod connecting said end to the body of the rod, the said members being of less width than the body section.

2. As a new article of manufacture, a connecting rod having the crank pin stub end formed integral with the rod, and a truss-like member formed integral with the rod and on the exterior thereof connecting the said end to the body of the rod, the said member being of less width than the body section of the rod.

3. As a new article of manufacture, a connecting rod having the crank pin stub end formed integral with the rod, and a pair of tapering truss-like members formed integrally with the rod, one above and one below, connecting said end to the body of the rod, the said members being of less width than the body section of the rod.

In testimony whereof I have hereunto signed my name.

WILLIAM E. WOODARD.

Copies of this patent may be obtained for five cents each, by addressing the "Commissioner of Patents, Washington, D. C."